Jan. 15, 1963  E. HAHN  3,073,224
PHOTOGRAPHIC CAMERA
Filed July 17, 1961
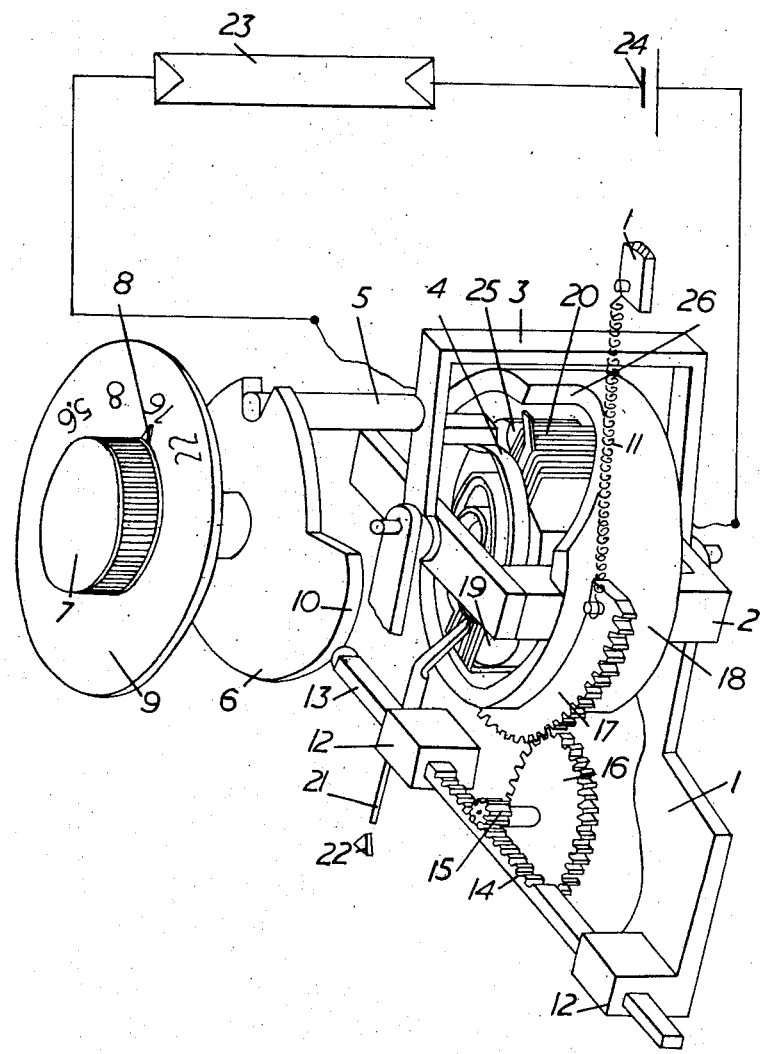
Inventor
ERICH HAHN
By Irwin S. Thompson
Attorney

United States Patent Office 3,073,224
Patented Jan. 15, 1963

3,073,224
PHOTOGRAPHIC CAMERA
Erich Hahn, Dresden, Germany, assignor to VEB Kamera- und Kinowerke Dresden, Dresden, Germany
Filed July 17, 1961, Ser. No. 124,595
6 Claims. (Cl. 95—10)

The invention relates to a photographic camera with exposure control device, the setting disc of which, coupled at least with one of the setting members for diaphragm and exposure time, shifts a pointer or the return springs of the moving coil.

Devices of this kind have already become known, wherein on the actuation of the setting member an electric resistance lying in the meter current circuit is varied, in order that in dependence upon the position of the setting member the characteristics of the meter can be varied according to desire. Here adjustable sliding contacts on the resistances are necessary, which give rise to erroneous meaesurements due to uncontrollable transit resistances occurring additionally here, especially with regard to the oxydisation of the conductive contacts, which cannot be absolutely suppressed. The aim of the invention is the provision of a device which avoids these disadvantages by variable design of the field intensity of the magnet in the region of the moving coil. The variation of the sensitivity is necessary to compensate for the non-linear characteristic of the meter.

In accordance with the invention this is achieved due to the fact that the setting disc is geared with a magnet movable in relation to the moving coil of the meter. The magnet is preferably rotatably mounted in relation to the moving coil. Where a core magnet meter is used, the magnet is expediently rigidly connected with the return ring, both of which can be provided with recesses, and is arranged rotatably together therewith. It may be adequate to rotate only a return ring provided with recesses. According to a special feature of the invention the setting disc possesses a control cam, with which there is in engagement a feeler pin coupled with the adjustable magnet. A toothing of the feeler pin here meshes possibly through an intermediate gearing with the toothed rim of the return ring. The details of the invention may be seen from an illustrated and described example of embodiment.

In a camera housing 1 (not separately shown) there is arranged the core magnet meter 2. The adjustable stirrup 3 of the meter holds the return springs 4 and is geared through the coupling pin 5 with the setting disc 6. With this setting disc 6 there is rigidly coupled the setting member 7, the mark 8 of which slides over a scale disc 9 provided with values for exposure factors e.g. diaphragm aperture ratios or time. The setting member 7 is coupled with either the aperture diaphragm or the shutter timing mechanism (neither of which are shown), in this example the aperture diaphragm, by any known coupling arrangement. This setting member can also be constructed as a part of a known differential gearing.

The feeler pin 13 sliding in guides 12 is in engagement with the control cam 10 of the setting disc 6. The toothing 14 of the feeler pin 13 meshes with the pinion 15, which is rigidly connected with the toothed wheel 16. This toothed wheel 16 is in engagement with the toothed rim 17 of the return ring 18. The return ring 18 is in turn rigidly connected with the magnet 19. The spring 11 attached to the return ring 18 overcomes the play between the toothings 14, 15, 16 and 17, but at the same time it constitutes the necessary operative connection between the feeler pin 13 and the control cam 10. The moving coil 20 is connected in series with a photo-conductive cell 23 on the battery 24.

The manner of operation is as follows:

When light impinges upon the photo-conductive cell 23, the current flux in the meter circuit varies, resulting in a deflection of the moving coil 20. A setting of the exposure factors such as diaphragm aperture or exposure time corresponding to the prevailing brightness is achieved when the pointer 21 stands opposite the fixed mark 22. This coincidence is brought about by rotation of the setting member 7, when the stirrup 3 carrying the return springs 4 is entrained through the setting disc 6 and the coupling pin 5. At the same time through the control cam 10 the feeler pin 13 is shifted, whereby the return ring 18 is rotated together with the magnet 19. In this manner the field intensity in the region of the moving coil 20 varies, resulting in a variation of the sensitivity of the meter. The sensitivity of the meter can be varied according to desire through the control cam 10 in dependence upon the movement of the setting member. In order to increase the influence upon the sensitivity, both the magnet 19 and also the return ring 18 can also be provided with recesses 25 and 26 respectively. It lies within the scope of the invention to arrange the magnet in axially movable fashion in relation to the moving coil.

I claim:

1. In a photographic camera having exposure factor setting means, an exposure meter including a moving coil rotatably mounted on a spindle on a fixed part of the camera for rotation in relation to a magnet which is movably mounted in the camera and a return spring connected between the spindle of said moving coil and a spring anchorage pivotally mounted on a fixed part of the camera, the provision of a setting member operatively connected to said exposure factor setting means and to said spring anchorage, and coupling means operatively connected between said setting member and said movable magnet, said coupling means having a non-linear transmission ratio according to the desired characteristics of the exposure meter.

2. In a photographic camera having an exposure factor setting means, an exposure meter including a moving coil rotatably mounted on a spindle on a fixed part of the camera for rotation in relation to a magnet which is also rotatably mounted in the camera and a return spring connected between the spindle of said moving coil and a spring anchorage pivotally mounted on a fixed part of the camera, the provision of a setting member operatively connected to said exposure factor setting means and to said spring anchorage, a cam element operatively connected to said setting member and rotatable thereby, a follower in engagement with said cam element and a coupling device connected between said follower and said magnet, said cam being profiled according to the desired characteristics of the exposure meter.

3. A photographic camera according to claim 2, wherein a ring is rotatably mounted in the camera around the moving coil and carries said magnet.

4. A photographic camera according to claim 3, wherein said follower is provided with a toothed rack and said ring is provided with teeth around its periphery, an intermediate gearing being provided between said toothed rack and said teeth on the ring.

5. A photographic camera as claimed in claim 2 wherein the magnet possesses a recess to influence the field intensity.

6. A photographic camera according to claim 3, wherein the ring possesses a recess to influence the field intensity.

References Cited in the file of this patent

UNITED STATES PATENTS

| | | |
|---|---|---|
| 2,250,898 | Tonnies | July 29, 1941 |
| 2,354,544 | Rath | July 25, 1944 |
| 2,933,991 | Sauer | Apr. 26, 1960 |